March 9, 1971  HIDETO FURUOKA  3,568,327
APPARATUS FOR DRAWING COMPOSITE PICTORIAL PATTERNS
Filed Nov. 6, 1968  6 Sheets-Sheet 1

Hideto Furuoka
INVENTOR.

BY
Attorney

Hideto Furuoka
INVENTOR.

BY George B. Oujevolk
Attorney ated Mar. 9, 1971

United States Patent Office 3,568,327

3,568,327
APPARATUS FOR DRAWING COMPOSITE PICTORIAL PATTERNS
Hideto Furuoka, Tokyo, Japan, assignor to Gakken Company Limited, Tokyo, Japan
Filed Nov. 6, 1968, Ser. No. 773,876
Claims priority, application Japan, Nov. 10, 1967, 42/94,450; June 8, 1968, 43/47,948; Oct. 31, 1968, 43/94,483
Int. Cl. B44d 3/30
U.S. Cl. 33—174    2 Claims

ABSTRACT OF THE DISCLOSURE

An apparatus for drawing composite pictorial patterns is provided with an inner frame notched all along its periphery for holding a disk perforated with a prototype aperture or apertures, an outer keep frame having an inner circular guide rail disposed on the inside thereof so as rotatably to set the inner frame on said guide rail, and means for mutually engaging said frames by interlocking with each notch by turns.

---

Figure 1:
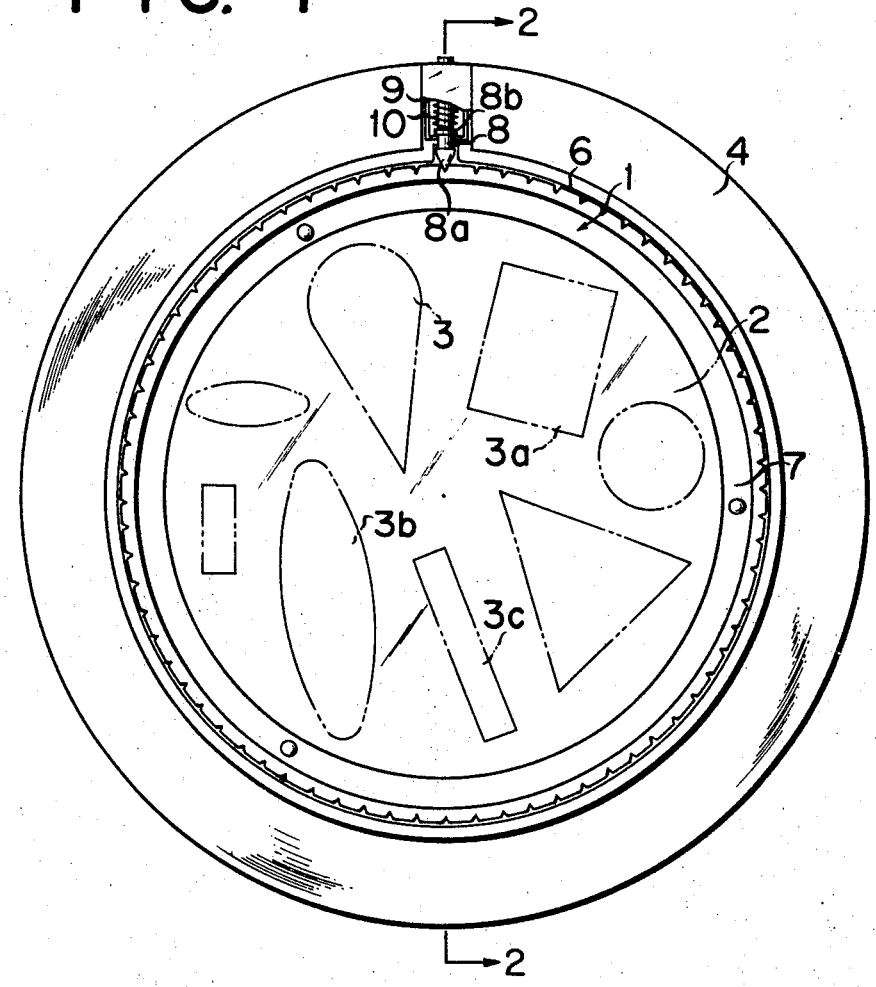

This invention relates to a composite pictorial pattern drawing apparatus capable of forming the respective patterns along the configuration of a firmly fixed prototype aperture.

The prior art pictorial pattern drawing apparatus bearing a trade name "Spiro-graph" has been employed in forming a continuous geometric pattern along an epi- or hypo-cycloidal locus with the movement of drawing members. However, it has been difficult to handle this apparatus so as distinctly to delineate the pattern.

Furthermore, the drawing apparatus was not only expensive but also of complicated design and moreover had to be subjected to precision machining in manufacture.

An object of this invention is to provide a composite pictorial pattern drawing apparatus of simple design capable of being easily handled so as distinctly to draw separate or composite patterns along a desired locus, such as a circular, sectorial and epi-cycloidal locus.

Said composite pictorial pattern drawing apparatus of this invention comprises an inner frame for holding a disk perforated with a prototype aperture or apertures, an outer keep frame having an inner circular guide rail disposed on the inside thereof so as rotatably to set the inner frame on said guide rail, a plurality of notches arranged along the periphery of said guide rail either on the outside of the inner frame or on the inside of the outer frame, and means for mutually engaging said frames by interlocking with each notch by turns.

In this case, said perforated disk may be integrally formed with said inner frame.

The pictorial pattern drawing apparatus may further involve a plurality of teeth formed on the outside of the outer frame and a guide rack member having notches each of which successively interlocks with each of the aforesaid teeth when the outer frame is rotated and, if required, removed and shifted for the mutual engagement of the outer frame and rack member over a desired number of said notches on said rack member.

Figure 2:
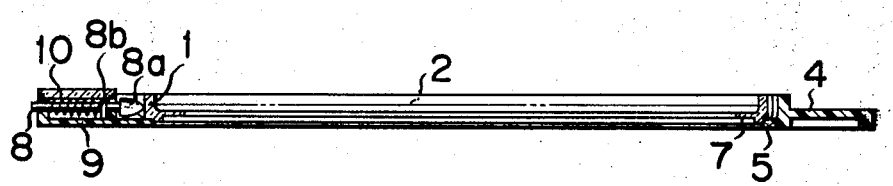
Figure 3:
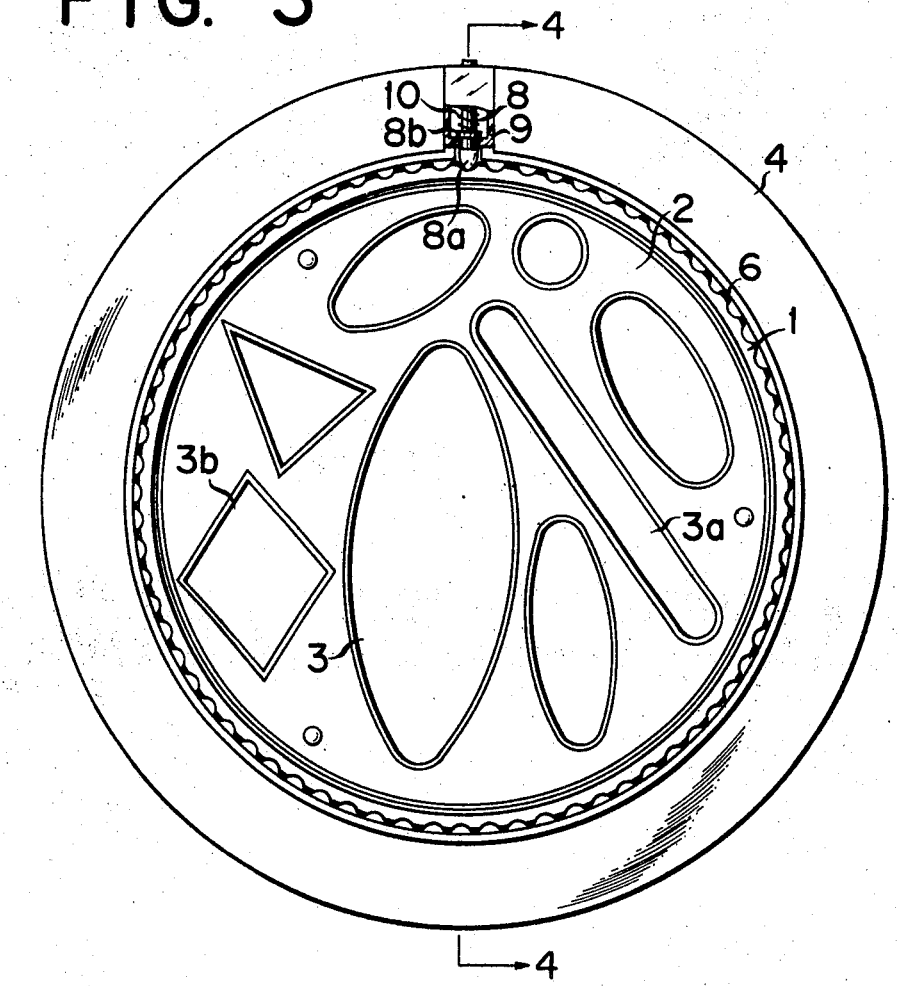
Figure 4:
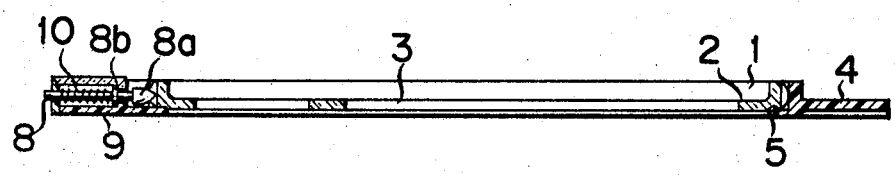
Figure 5:
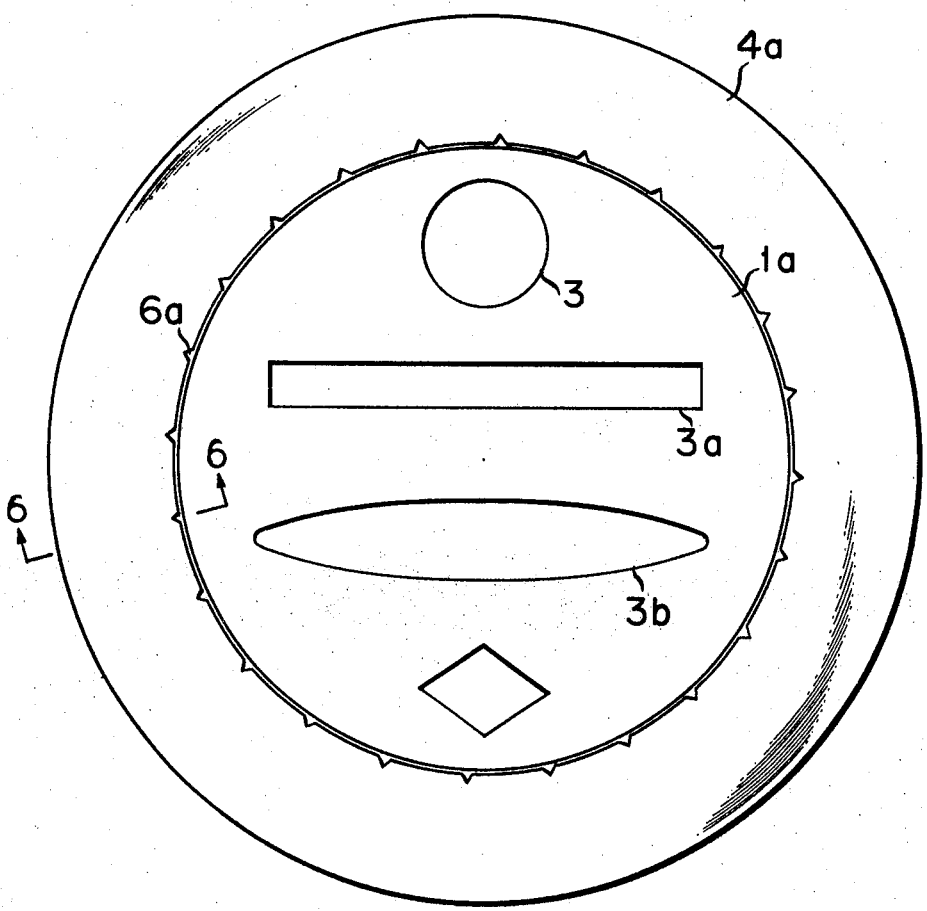
Figure 6:
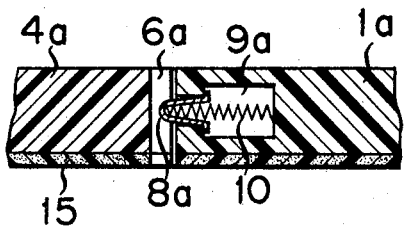
Figure 7:
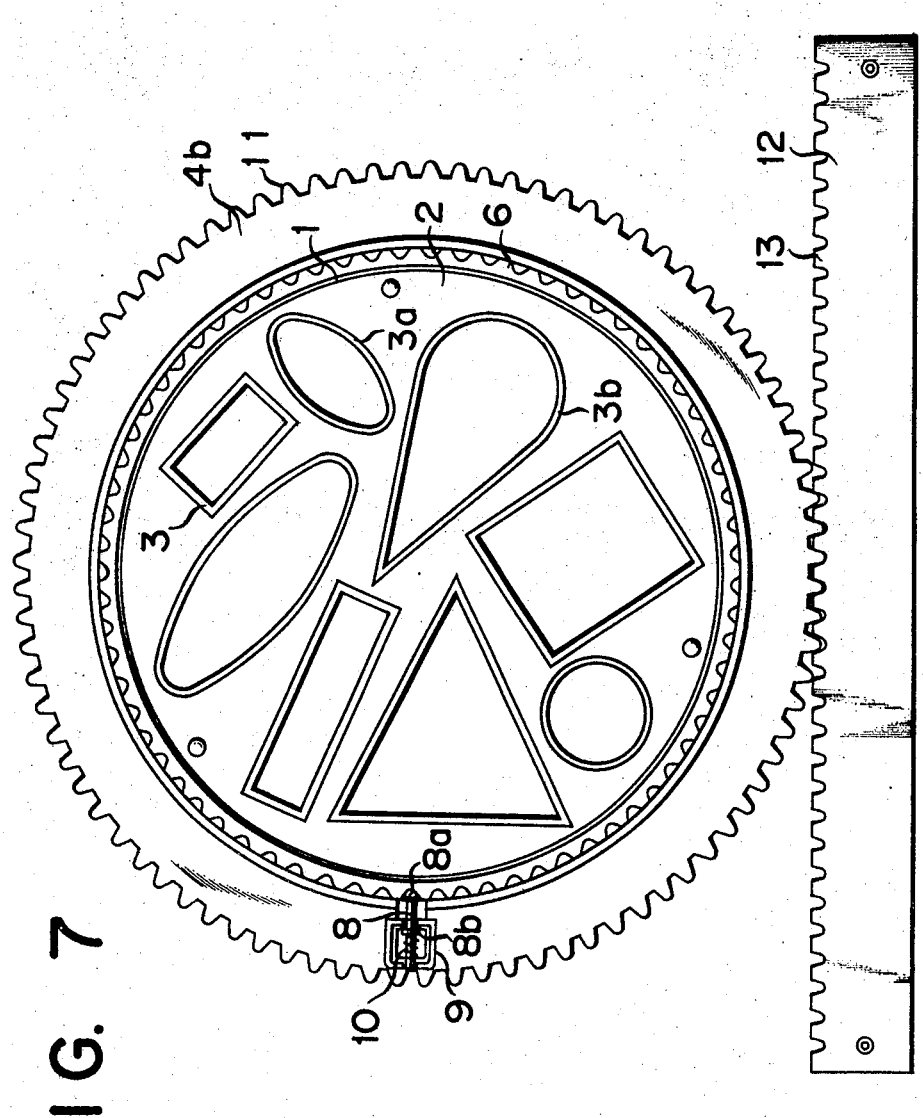
Figure 8:
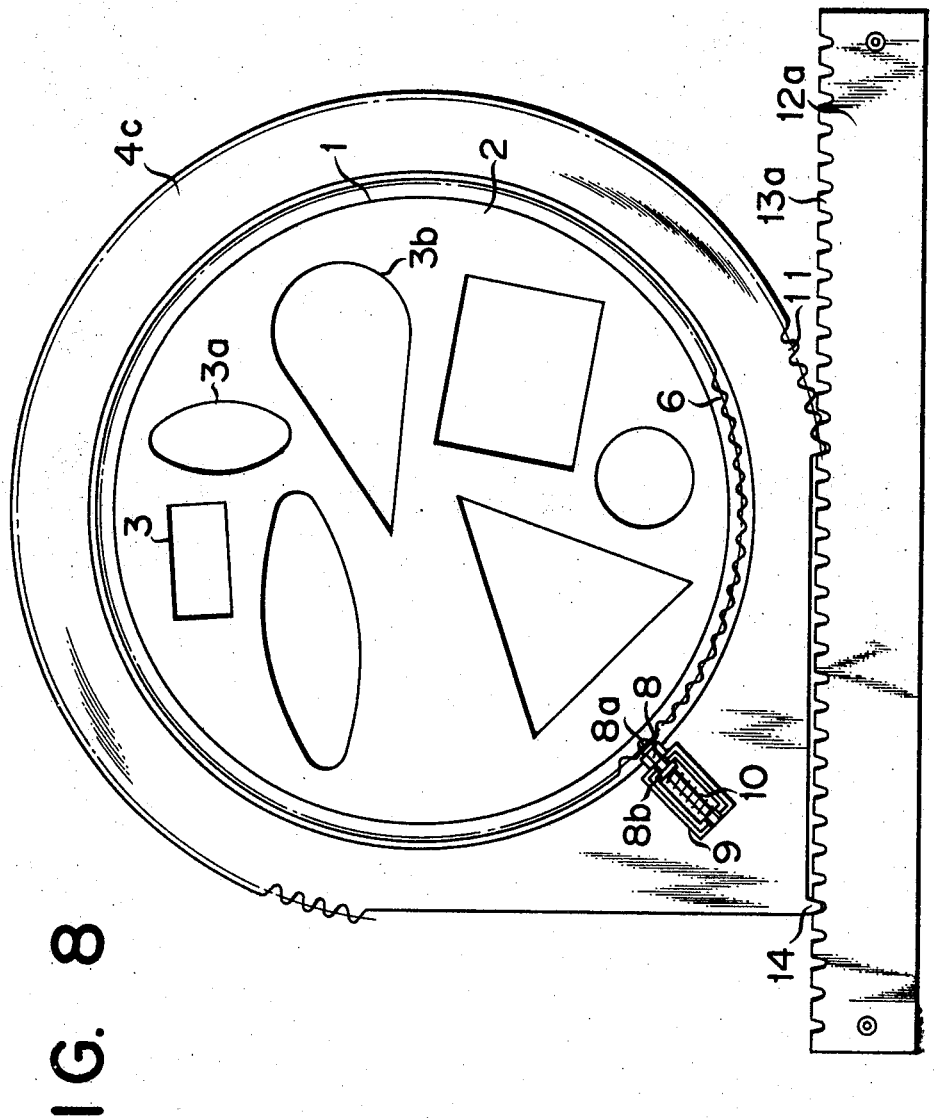
Figure 9:
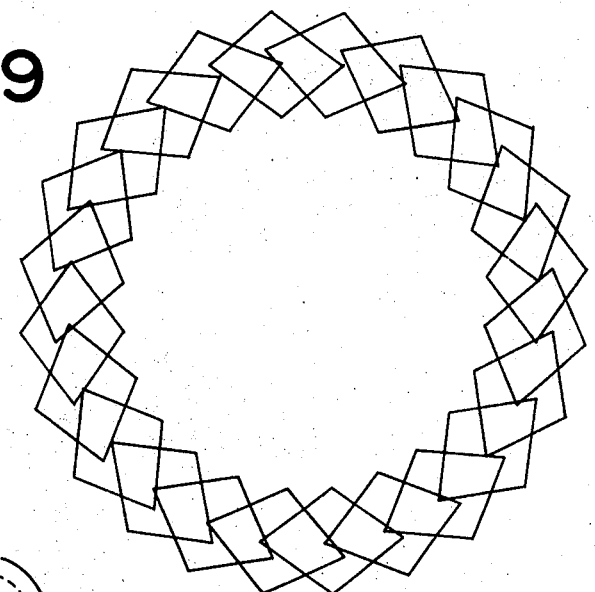
Figure 10:
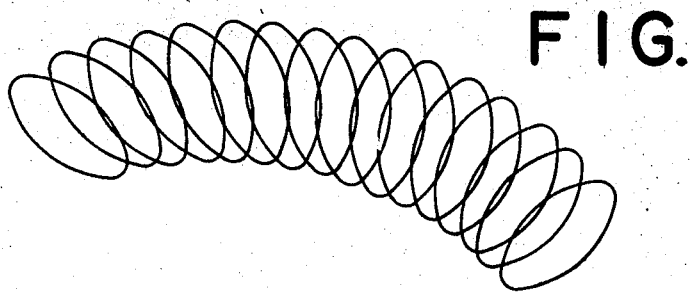
Figure 11:
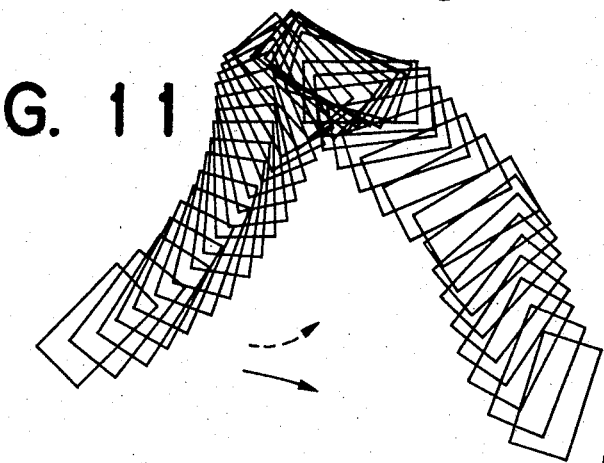

The present invention can be more fully understood from the following description when taken in conjunction with the appended drawings, in which:

FIG. 1 is a plan view of a pictorial pattern drawing apparatus embodying this invention;
FIG. 2 is a cross-sectional view of said apparatus taken along line 2—2 indicated in FIG. 1;
FIG. 3 is a plan view of a pictorial pattern drawing apparatus modified from that of FIGS. 1 and 2;
FIG. 4 is a cross-sectional view of said apparatus taken along 4—4 indicated in FIG. 3;
FIG. 5 is a plan view of a pictorial pattern drawing apparatus according to another embodiment of this invention;
FIG. 6 is a cross-sectional view of said apparatus taken along lnie 6—6 indicated in FIG. 5;
FIG. 7 is a plan view of a pictorial pattern drawing apparatus according to further embodiment of this invention;
FIG. 8 is a plan view of a pictorial pattern drawing apparatus further modified from that of FIG. 7;
FIG. 9 is composite patterns delineated by use of the apparatus illustrated in FIGS. 1 and 2; and
FIGS. 10 and 11 are composite patterns delineated by use of the apparatus illustrated in FIG. 7 or 8.

A pictorial pattern drawing apparatus of this invention illustrated in FIGS. 1 and 2 comprises an inner annular frame 1 for holding a disk 2 perforated with prototype apertures 3, 3a and 3b, an outer keep frame 4 having an inner circular guide rail 5 disposed on the inside thereof, a plurality of notches 6 arranged along the periphery of said guide rail on the outside of said inner frame, and means for mutually engaging said frames 1 and 4 by interlocking with each notch 6 by turns.

Said inner frame involves a stepped stage 7 for receiving the peripheral portion of said disk 2. Said engaging means involves a locking member 8 having a conical head 8a removably interlocking with each notch 6 and which is disposed in a box-shaped housing 9 formed on the outer frame 4, and a coiled spring member 10 for urging the locking member 8 to the notch 6. Namely, one end of said spring member 10 is attached to the flange 8b of the locking member 8 formed at the intermediate portion, and the other end to the outside wall of said housing, so that the conical head 8a of the locking member 8 may be urged to the notch 6 aligned thereto by the resistance of said spring member.

In this embodiment, said disk 2 may be rigidly secured on said inner frame by means of adhesive tape.

The user of the present apparatus may rigidly keep the outer frame 4 on a sheet of drawing paper with his left hand and delineate a pattern along the configuration of the selected one of said prototype apertures with his right hand. The user next rotatingly shifts the inner frame 1 by a desired number of said notches 6 and delineates the same pattern again. Repetition of the aforementioned operation causes composite patterns to be formed on the sheet along a circular locus as shown in FIG. 9.

An apparatus illustrated in FIGS. 3 and 4 is constructed similarly to that of FIGS. 1 and 2 except of the fact that the disk 2 is integrally formed with the inner frame 1.

An apparatus illustrated in FIGS. 5 and 6 involves an outer frame 4a having a plurality of notches 6a provided on the inside thereof, and an inner frame 1a having locking means of the similar type as is illustrated in FIGS. 1 and 2. Namely, said locking means involves a cap-shaped locking member 8d removably interlocking with each notch 6a and which is disposed in a bore 9a formed at the peripheral portion of the inner frame and a coiled spring member 10 for urging the locking member 8 to to the notch, said spring member being interposed between the back end of said cap and the bottom of said bore 9a.

The operation of this embodiment is the same as that of the first-mentioned embodiment disclosed in FIGS. 1 and 2. Therefore the detail in respect of the operation is eliminated for avoiding the complicated and duplicated description.

An apparatus shown in FIG. 7 is constructed similarly to that of FIGS. 1 and 2 except of the fact that the outer frame 4b has a plurality of teeth 11 formed on the periphery thereof and a guide rack member 12 having a plurality of notches 13 is further provided.

When this apparatus is employed, the rack member 12 is previously set on a sheet of drawing paper. After more than one configurations of an identical pattern were delineated on the sheet by the same operation as is described in the explanation of the first-mentioned embodiment, the outer frame 4b is rotated or removed and shifted for the mutual engagement of the outer frame and rack member over a desired number of said notches 13 by successively interlocking with each of the notches 13.

An apparatus illustrated in FIG. 8 is modified from that of FIG. 9. This embodiment involves a protrusion extending sidewise from the outer frame 4c and having a separate tooth 14 from the teeth 11a formed on the periphery of the outer frame 4c. Said tooth 14 is adapted to ensure the setting of the outer frame 4c on the rack member 12a as shown in FIG. 9.

When the apparatus is employed with the aid of said tooth 14, the outer frame 4c is merely removed and shifted for the mutual engagement over a desired number of said notches 13a.

Both apparatus of the latter two embodiments can be used to delineate composite patterns along a desired complicated locus as shown in FIGS. 10 and 11. The respective loci of FIGS. 10 and 11 are defined by a combination of the rotation of the inner frame relative to the outer frame and the shifting or rotation of the outer frame relative to the rack member.

Namely, when the pattern is delineated along the configuration of the prototype aperture each time the inner frame is rotated over a number of notches on the outer frame in a clockwise direction and the outer frame is rotated over a number of notches on the rack member in a clockwise direction, then composite patterns are formed on the sheet along a locus defined by one rotation of the outer frame, namely a curved line extending as shown in FIG. 10, from the starting point to the middle point of an epicycloidal locus.

When the pattern is delineated along the configuration of the aperture each time the inner frame is rotated over a number of notches on the outer frame in an anti-clockwise direction and the outer frame is removed and shifted over a number of notches on the rack member, then composite patterns are formed on the sheet along a complicated locus as shown in FIG. 11.

All the embodiments may include a friction sheet 15 such as a thin foamed resinous sheet, felting sheet and woolen sheet attached to the under surface of the outer frame and rack member, so as steadily to set the outer frame and member on the sheet.

In these embodiments, the same parts of the apparatus except the modified ones are represented by common numerals and said modified parts are specifically designated by adding a suffix letter to the numeral.

What is claimed is:

1. In an apparatus for drawing composite pictorial patterns comprising: an inner circular frame; a plurality of notches formed along the periphery of said inner circular frame at equal spaces; a disk, perforated with at least one prototype aperture and held by the inner portion of said inner circular frame; an outer stationary keep frame having an inner circular guide rail, disposed on the inside thereof, said inner frame being rotatably set in said outer frame with the periphery of said inner frame positioned on said guide rail; a housing, formed on the outer frame; a locking member retractably disposed in said housing and having a head, projecting from said housing to the periphery of said inner frame so as to be engageable with the corresponding notch; a spring member, for urging said head of the locking member toward the notch, thereby causing the disk to be fixedly positioned each time the inner frame is rotated or advanced along the guide rail for one or more pitches of said notches by successively engaging the head with said notches, the improvement therein wherein said outer keep frame has a plurality of teeth disposed on the outer periphery thereof; and there is provided a guide rack member having notches capable of being removably engaged with said teeth.

2. An apparatus for drawing composite pictorial patterns claimed in claim 1 in which said outer keep frame further has a separate tooth for ensuring the attachment of said outer keep frame to the rack member.

References Cited

UNITED STATES PATENTS

| | | | |
|---|---|---|---|
| 1,672,751 | 6/1928 | Conti | 33—174B |
| 2,950,537 | 8/1960 | Fixen | 33—174B |
| 3,230,624 | 1/1966 | Fisher | 33—27L |

SAMUEL S. MATTHEWS, Primary Examiner